(12) United States Patent
Luo et al.

(10) Patent No.: US 12,146,936 B2
(45) Date of Patent: Nov. 19, 2024

(54) TECHNIQUES FOR COOPERATIVE PASSIVE POSITIONING

(71) Applicant: HUAWEI TECHNOLOGIES CO., LTD., Guangdong (CN)

(72) Inventors: Jian Luo, Munich (DE); Richard Stirling-Gallacher, Munich (DE); Zhongfeng Li, Shanghai (CN); Mario Hernán Castañeda Garcia, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 769 days.

(21) Appl. No.: 17/206,287

(22) Filed: Mar. 19, 2021

(65) Prior Publication Data

US 2021/0223376 A1   Jul. 22, 2021

Related U.S. Application Data

(63) Continuation of application No. PCT/EP2018/075521, filed on Sep. 20, 2018.

(51) Int. Cl.
*G01S 13/00* (2006.01)
*G01S 13/931* (2020.01)
(Continued)

(52) U.S. Cl.
CPC .......... *G01S 13/003* (2013.01); *G01S 13/931* (2013.01); *H04L 5/0048* (2013.01); *H04W 4/40* (2018.02); *G01S 2013/9316* (2020.01)

(58) Field of Classification Search
None
See application file for complete search history.

(56) References Cited

U.S. PATENT DOCUMENTS

2003/0006930 A1* 1/2003 Lodwig ................ G01S 13/878
                                                                        342/146
2004/0214584 A1* 10/2004 Marinier .............. H04W 4/023
                                                                        455/406

(Continued)

FOREIGN PATENT DOCUMENTS

WO   2019145019 A1   8/2019

OTHER PUBLICATIONS

Gholami et al., "A distributed positioning algorithm for cooperative active and passive sensors," 21st Annual IEEE International Symposium on Personal, Indoor and Mobile Radio Communications, Dec. 17, 2010, 6 pages.

(Continued)

*Primary Examiner* — Marcus E Windrich
(74) *Attorney, Agent, or Firm* — Fish & Richardson P.C.

(57) ABSTRACT

The present disclosure relates to a network device, in particular a User Equipment (UE) or a base station (BS), of a group of network devices involved in a cooperative passive positioning (CPP) operation comprising at least two network devices for detecting and positioning at least one target object. One example network device is configured to apply an operation mode from one or more of: initiating network device for initiating a CPP measurement, transmitting network device for transmitting a radio signal to scan for an environment of the network device, receiving network device for receiving a reflection signal based on a reflection of the radio signal from the at least one target object, and data fusion network device for detecting and positioning the at least one target object based on at least one of the reflection signal or a Line-of-Sight (LOS) signal.

20 Claims, 10 Drawing Sheets

(51) Int. Cl.
*H04L 5/00* (2006.01)
*H04W 4/40* (2018.01)

(56) References Cited

U.S. PATENT DOCUMENTS

| | | | | |
|---|---|---|---|---|
| 2008/0055157 A1* | 3/2008 | Sahinoglu | ............. | G01S 13/878 |
| | | | | 342/450 |
| 2009/0286510 A1* | 11/2009 | Huber | ................ | G06Q 20/1235 |
| | | | | 455/445 |
| 2010/0177681 A1* | 7/2010 | Sahinoglu | ............... | G01S 13/46 |
| | | | | 370/328 |
| 2014/0310031 A1* | 10/2014 | Ricci | .................. | G06Q 30/0633 |
| | | | | 705/5 |
| 2014/0310788 A1* | 10/2014 | Ricci | ...................... | G01C 21/26 |
| | | | | 726/6 |
| 2017/0359713 A1* | 12/2017 | Fodor | .................... | H04W 4/023 |
| 2019/0349715 A1* | 11/2019 | Ghourchian | ............ | H04W 4/33 |

OTHER PUBLICATIONS

PCT International Search Report and Written Opinion issued in International Application No. PCT/EP2018/075521 on Dec. 13, 2018, 11 pages.
Soatti et al., "Enhanced Vehicle Positioning in Cooperative ITS by Joint Sensing of Passive Features," IEEE 20th International Conference on Intelligent Transportation Systems, Oct. 2017, 7 pages.
Thomä et al., "Cooperative Passive Coherent Location: A Promising Service for Future Mobile Radio Networks," arXiv:1802.04041v1 [eess.SP] Feb. 12, 2018, 8 pages.

* cited by examiner

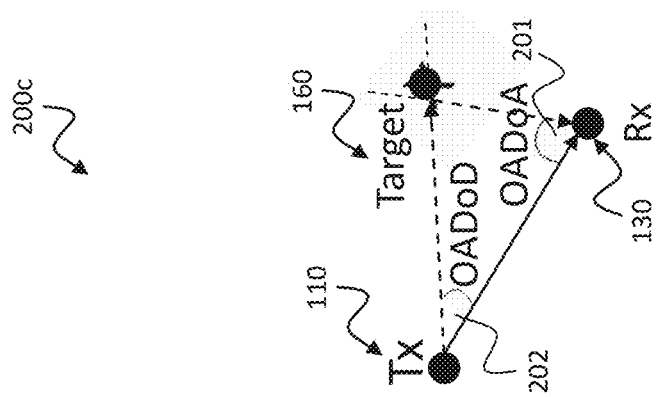
Fig. 2 c OADoA + OADoD based
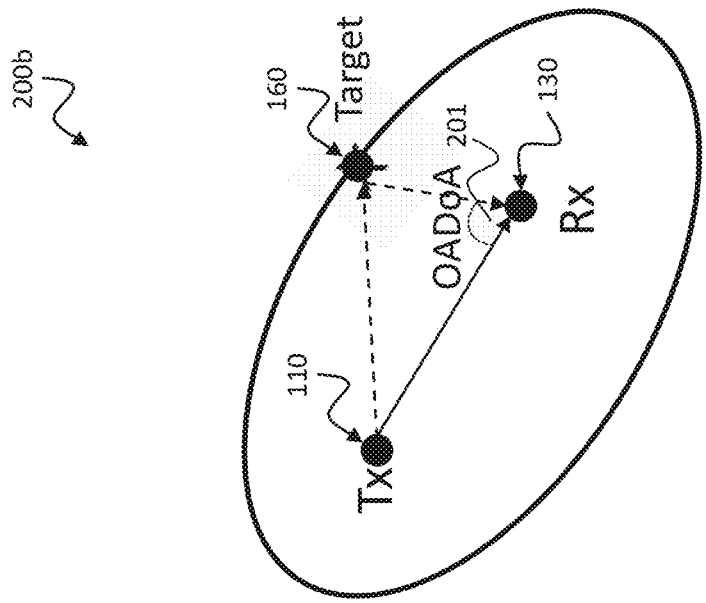
Fig. 2 b OTDoA + OADoA based
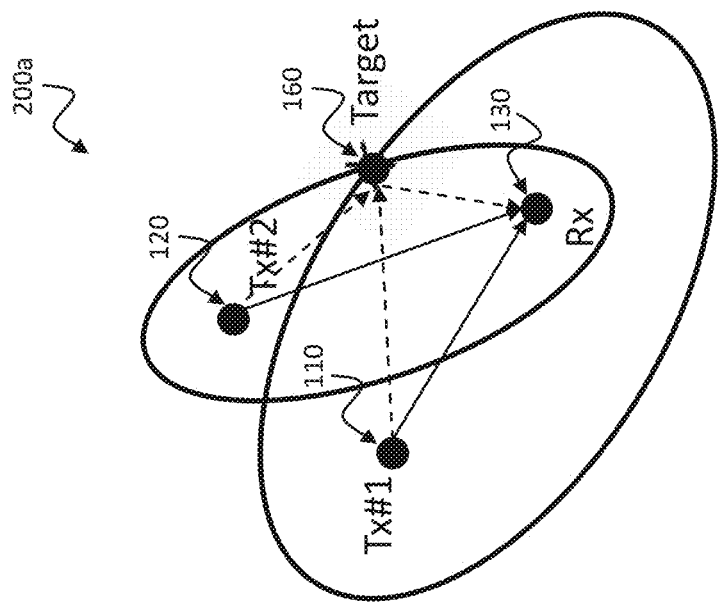
Fig. 2 a Pure OTDoA based

| 301 | 302 | 303 | 304 | 305 | 306 | 307 | 308 |
|---|---|---|---|---|---|---|---|
| Cooperative Beam/ResourceSweeping Request | iUE ID | iUE position (opt) | BF capability (Nr. Of beams, etc.) | Gen./par. illumination | If par. illum: Area for illum. (e.g. Position offset + radius) / Rough position of already identified targets (opt) | List of neighboring UE ID (opt) | Prefered panel of each neighboring UE (opt) |

Fig. 3a

| 311 | 312 | 313 | 314 | 315 | 316 | 317 |
|---|---|---|---|---|---|---|
| Cooperative Beam/ResourceSweeping Request | iUE ID | iUE position | iUE transmits reference (0) or neighboring UE transmits (1) | Preferred panel for CPP-ref. Transmission/Reception | Preferred resource for CPP-ref. Transmission/Reception | ... |

Fig. 3b

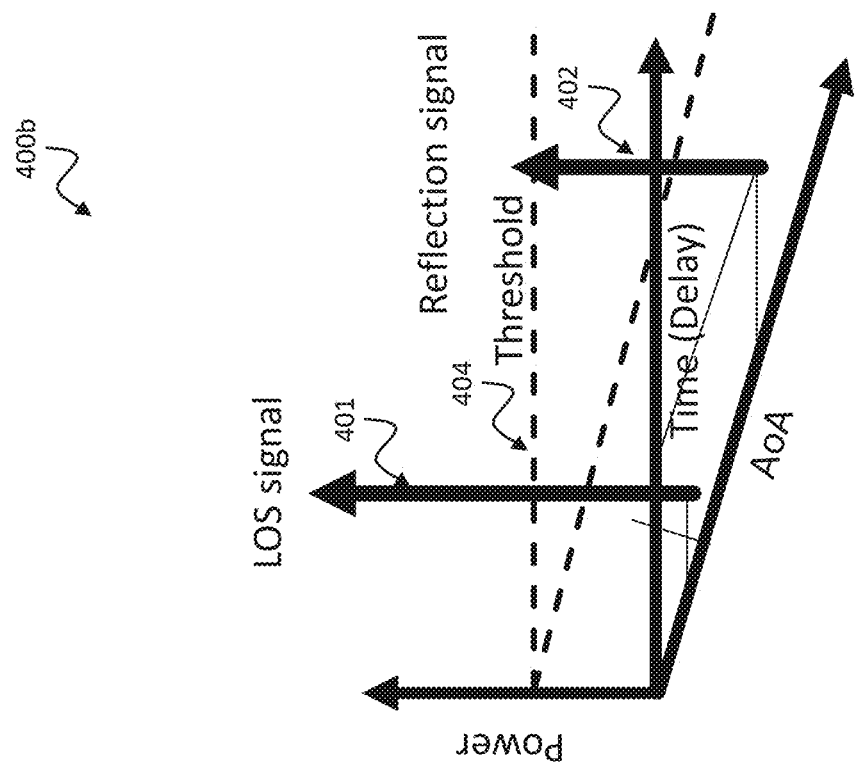
Fig. 4 (b) OTDoA + OADoA based
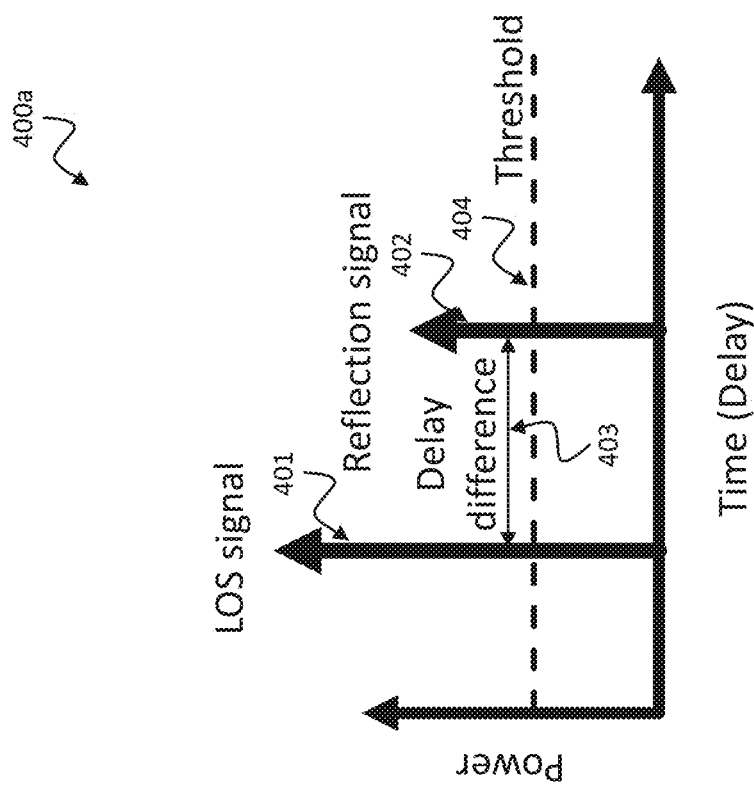
Fig. 4 (a) Pure OTDoA based

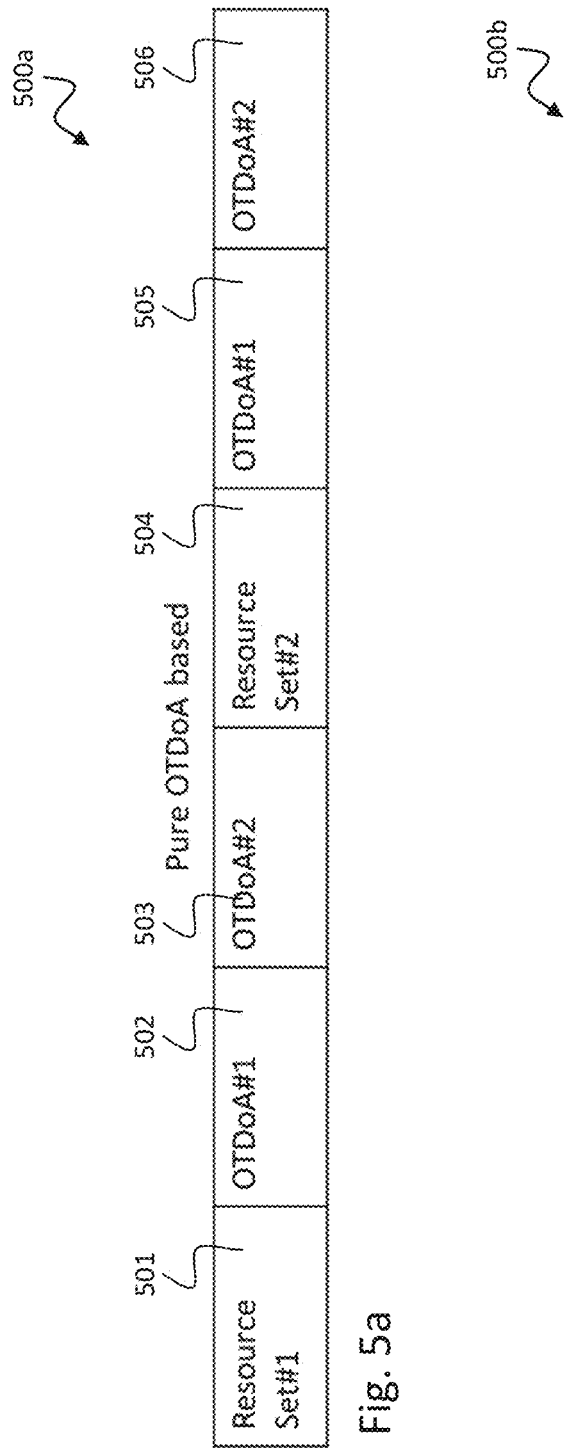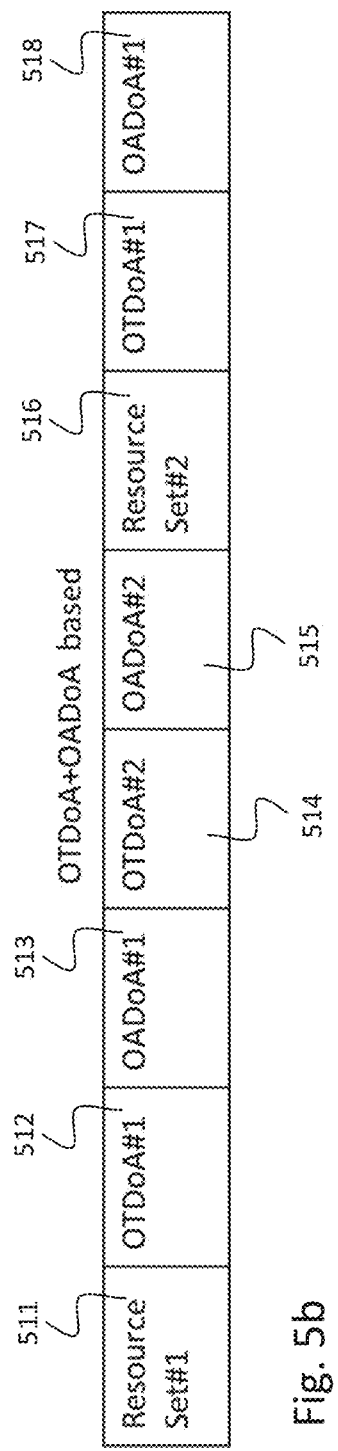
Fig. 5a
Fig. 5b

TECHNIQUES FOR COOPERATIVE PASSIVE POSITIONING

CROSS-REFERENCE TO RELATED APPLICATIONS

This application is a continuation of International Application No. PCT/EP2018/075521, filed on Sep. 20, 2018, the disclosure of which is hereby incorporated by reference in its entirety.

TECHNICAL FIELD

The present disclosure relates to techniques for Cooperative Passive Positioning (CPP), in particular to signaling methods for enabling CPP in communication systems such as 5G NR (New Radio).

BACKGROUND

Environment awareness is essential for road safety and intelligent traffic system. Radio based positioning is one important technology to achieve this environment awareness.

Currently, wireless communication network such as cellular network can perform positioning of UEs (User Equipments) which are actively receiving and sending radio signals. However, many road users, e.g. legacy cars, bicycles, pedestrian, are not capable such "active positioning". Such road users are called "Passive Targets" in the positioning sense, which may be positioned by car radar sensing (Mono-Static). However, car radars suffer problems and limitations, e.g. interference. Thus, further technologies should be used to complement car radar.

One technology for solving this problem is that UEs and base stations (BS)/roadside units (RSU) in the wireless communication network such as cellular network cooperate with each other and use the frequency resource of the wireless communication network for detection and positioning of the passive targets. Current wireless communication networks and the existing standardized signaling, however, do not support such cooperation. Further, the performance of such cooperative techniques (e.g. positioning accuracy) depends on the selection of transmitter (Tx) nodes and receiver (Rx) nodes and further parameters, as well as their configuration and coordination.

SUMMARY

It is the object of the application to provide techniques for enabling the wireless communication network to efficiently operate positioning techniques for detecting passive targets. It is a further object of the application to define signalling methods and configuration methods for network nodes of the wireless communication network to enable such positioning techniques.

These objects are achieved by the features of the independent claims. Further implementation forms are apparent from the dependent claims, the description and the figures.

A basic idea of the application is to apply "Cooperative Passive Positioning (CPP)" and appropriate signalling methods to implement CPP in the cellular network. According to CPP, the receiving UEs can estimate the position of the targets based on two types of signals: 1) The Line-of-Sight (LOS) signal from a transmitter (Tx); 2) The reflection signal which was transmitted from a Tx and reflected from the target. The Tx and Rx can be from different network nodes.

According to the concept of the application several procedures are introduced to enable CPP operation in wireless communication networks such as cellular networks. These procedures address different options of CPP operation, including e.g.:
- The CPP operation is initiated by a UE or by the network.
  - In the first case, the UE initiating CPP operation is called "iUE";
  - The reference signal for CPP operation is sent by the iUE, its neighboring UE or the BS/RSU;
- One or more of the following parameters are measured by the Rx's involved in the CPP operation (called CPP-Rx): OTDoA (Observed Time Difference of Arrival), OADoA (Observed Angular Difference of Arrival), OADoD (Observed Angular Difference of Departure) and received power etc.;
- Whether the Data Fusion Node (DFN) requires input about measured parameters from other nodes.

Three novel signalling methods are presented hereinafter, which can be used for the above procedures:
- CPP-Request: A request sent by the UE to the network for cooperatively positioning the targets in the environment. Especially, the iUE can specify whether all its surrounding should be searched (for detecting targets) or only a special area needs to be searched;
- Measurement and Feedback configuration for CPP-Rxs: The network or a UE (e.g. in out-of-coverage case, the coordinating UE) specifies a threshold for extracting Multi-Path Components (MPC, incl. LOS), the parameters to be measured, such as OTDoA, OADoA, OADoD and received power, and the destination nodes for sending feedback;
- Data fusion node (DFN) configuration: The network or a UE informs a node to perform data fusion (calculation of the target positions) and also informs the DFN about the corresponding Tx antenna position of each transmitted reference signal (from which the parameters such as OTDoA, OADoA, OADoD and received power will be measured by the CPP-Rxs).

With the disclosed signaling as described hereinafter, all options of CPP operation are supported. Further, maximum reuse of the existing signaling defined in the 3GPP standard is supported, and thus standardization and implementation is facilitated.

To summarize, the basic concept of the application is to introduce the above described novel signaling methods. In the CPP operation, the following roles are defined: Initiator (iUE or the network), the CPP-Txs, the CPP-Rxs, and DFNs. A UE or the network can act multiple of such roles. For the initiator, when it is a UE, the disclosed CPP-request signaling can be used. For CPP-Rx, the disclosed measurement and feedback configuration signaling can be used. For the DFN, the DFN configuration signaling can be used. Note that for the CPP-Tx, existing configuration signaling in the 3GPP standard can be used.

The disclosed techniques are of particular relevance to 5G NR standardization.

In order to describe the application in detail, the following terms, abbreviations and notations will be used:
CPP: Cooperative Passive Positioning
LOS: Line of Sight
RS: Roadside Unit
UE: User Equipment
iUE: UE initiating CPP operation BS: Base Station, gNodeB, eNodeB
NR: New Radio (standard)
V2V: Vehicle to vehicle
Tx: Transmitter
Rx: Receiver
DF: Data Fusion
DFN: Data Fusion Node
OTDoA: Observed Time Difference of Arrival
OADoA: Observed Angular Difference of Arrival
OADoD: Observed Angular Difference of Departure
CPP-TX: A transmitter sending reference signal for CPP
CPP-Rx: A receiver receiving reference signal(s) for CPP and performing certain
measurements (e.g. OTDoA)
CPP-DFN: A data fusion node that computes the targets positions based on (multiple) measurements
TX/RX: Tx/Rx antenna or a Tx/Rx antenna array
MPP: Multipath components
SP2MP: Single Point to Multi Point
MP2SP: Multi Point to Single Point
MP2MP: Multi Point to Multi Point
SP2SP: Single Point to Single Point
RSRP: Receive Signal Receive Power According to a first aspect, the application relates to a network device, in particular a User Equipment, UE, or a base station, BS, of a group of network devices involved in a cooperative passive positioning, CPP, operation comprising at least two network devices for detecting and positioning at least one target object, wherein the network device is configured to: apply an operation mode from one or more of the following operation modes: initiating network device for initiating a CPP measurement, transmitting network device for transmitting a radio signal to scan for an environment of the network device, receiving network device for receiving a reflection signal based on a reflection of the radio signal from the at least one target object, and data fusion network device for detecting and positioning the at least one target object based on the reflection signal and/or a Line-of-Sight signal.

Such a network device provides a flexible and accurate solution for detecting target objects by efficiently exploiting the resources of the wireless communication network such as cellular network. The network device can be applied in different scenarios, for example for Vehicle-to-Vehicle positioning via the sidelink or network coordinated via the uu link.

In an implementation form, the network device is configured to transmit a CPP request for initiating a CPP measurement with a second network device of the group of network devices, the CPP request comprising information about a search area for cooperatively detecting and locating the at least one target object, when the operation mode is applied as initiating network device.

This provides the advantage that a first network device can indicate the desired search area in which a target should be detected to a second network device which may assist the first network device by searching the environment of the first network device. Cooperative searching improves the detection probability to find any passive target objects.

In an implementation form of the network device, the CPP request comprises information about an illumination by the transmitted radio signal, in particular about a general illumination or a partial illumination of neighborhood areas of the transmitting network device.

This provides the advantage that depending on knowledge of the first network device, general illumination or partial illumination can be chosen. Hence, target detection can be efficiently performed.

In an implementation form, the network device is configured to: transmit the CPP request to a base station via uplink or to a neighboring UE via sidelink, indicate whether the network device or the neighboring UE shall transmit reference signals when transmitting the CPP request via the sidelink, and receive a confirmation message or a rejection message from the base station after transmitting the CPP request via the uplink.

This provides the advantage that detection of passive objects can be flexible performed by sidelink transmission or by uplink transmission depending on the scenario.

In an implementation form, the network device is configured to receive a reference transmission configuration, Tx-Conf, indicating a reference signal configuration, when the operation mode is applied as transmitting network device.

This provides the advantage that a common reference signal can serve for illumination purposes.

In an implementation form of the network device, the reference transmission configuration comprises information about transmitting node IDs, a resource and beamforming configuration of the reference signals and/or a type of the reference signals for each transmitting network device.

This provides the advantage that the reference transmission can be flexible adjusted.

In an implementation form, the network device is configured to receive a measurement and feedback configuration, MF-Conf, indicating a measurement and feedback configuration, when the operation mode is applied as receiving network device.

This provides the advantage that measurement and feedback can be flexible adjusted.

In an implementation form of the network device, the measurement and feedback configuration comprise information about a threshold for extracting multipath components, parameters to be measured, in particular a received power to be measured by the receiving network device and/or one or more destination network devices for sending feedback, wherein the parameters to be measured are from one or a combination of the following: Observed Time Difference of Arrival, OTDoA, Observed Angular Difference of Arrival, OADoA, Observed Angular Difference of Departure, OADoD, with respect to Line-of-Sight, LOS, and reflection among the multi-path components of the transmitted radio signal.

This provides the advantage that only the strongest signal components can be used for detecting the target and different measurement procedures can be selected.

In an implementation form of the network device, a set of the parameters to be measured, in particular a set of OTDoA, OADoA, OADoD, corresponds to one transmitting network device.

This provides the advantage that for each transmitting device the optimal measurement method and respective parameters can be selected.

In an implementation form, the network device operating as receiving network device is configured to receive information from a network device of the group of network devices operating as transmitting network device, wherein the information is about an angular of departure, AoD, difference between different radio resources used to transmit a reference signal.

This provides the advantage that by using AoD, detection can be facilitated and improved.

In an implementation form of the network device, the receiving device is configured to feedback a measured received signal of at least a subset of transmitted beamformed signals, and the transmitting device is configured to estimate the AoD difference based on the feedback.

This provides the advantage that the feedback facilitates cooperation of the network nodes, thereby sharing a computation load between the network nodes.

In an implementation form, the network device is configured to receive a data fusion configuration, DF-Conf, indicating a processing of measurement results, when the operation mode is configured as a data fusion network device.

This provides the advantage that any network node can be applied as data fusion node. For example, network nodes that have free resources are well suited to act as data fusion nodes.

In an implementation form of the network device, the data fusion configuration comprises: information about measurement results from the one or more receiving network devices, information about a location of the one or more transmitting network devices and the one or more receiving network devices and information about a mapping between the measurement results and the location of the one or more transmitting network devices and the one or more receiving network devices.

This provides the advantage that the data fusion nodes can be optimally controlled.

In an implementation form, the network device is configured to apply the operation mode of the network device with network coordination, in particular according to Mode 3 of the LTE-Vehicle standard; or to apply the operation mode of the network device in the CPP network without network coordination, in particular according to Mode 4 of the LTE-Vehicle standard.

This provides the advantage that different scenarios can be efficiently exploited, e.g. scenarios that are already defined in the LTE-Vehicle standard.

In an implementation form, the network device operating as receiving network device is configured to report a number of target objects above a maximum configured number of target objects or a number of identified target objects to a network, in particular to a base station.

This provides the advantage that multiple target objects can be efficiently identified.

In an implementation form, the network device is configured to send a message in which the number of detected target objects is reported.

This provides the advantage that a flexible number of target objects can be efficiently reported.

In an implementation form, the network device operating as transmitting network device is configured to enhance power and/or radio resources of signal components, in particular beams, of the radio signal pointing in other directions than a line-of-sight, LOS, direction towards a receiving network device.

This provides the advantage that the reflection signal power is enhanced to facilitate parameter estimation for positioning purpose.

In an implementation form, a network device operating as transmitting network device is configured as network device operating as receiving network device and vice versa for a next reference signal transmission.

This provides the advantage of reduced scheduling overhead and enhanced positioning accuracy.

According to a second aspect, the application relates to a method for configuring a network device, in particular a User Equipment, UE, or a base station, BS, of a group of network devices involved in a cooperative passive positioning, CPP, operation comprising at least two network devices for detecting and positioning at least one target object, wherein the method comprises: applying an operation mode from one or more of the following operation modes: initiating network device for initiating a CPP measurement, transmitting network device for transmitting a radio signal to scan for an environment of the network device, receiving network device for receiving a reflection signal based on a reflection of the radio signal from the at least one target object, and data fusion network device for detecting and positioning the at least one target object based on the reflection signal and/or a Line-of-Sight signal. The implementation forms of the network device described above with respect to the first aspect may be applied as well for the method according to the second aspect.

Such a method provides a flexible and accurate solution for detecting target objects by efficiently exploiting the resources of the wireless communication network. The method can be applied in different scenarios, for example for Vehicle-to-Vehicle positioning via the sidelink or network coordinated via the uu link.

According to a third aspect, the application relates to a computer program product including computer executable code or computer executable instructions that, when executed, causes at least one computer to execute the method according to the second aspect. Such a computer program product may include a non-transient readable storage medium storing program code thereon for use by a processor, the program code comprising instructions for performing the methods or the computing blocks as described hereinafter.

BRIEF DESCRIPTION OF THE DRAWINGS

Further embodiments of the application will be described with respect to the following figures, in which.

FIGS. 2a, 2b and 2c show different approaches for obtaining target position via CPP according to the disclosure;

FIG. 3a shows a schematic diagram illustrating an exemplary CPP request via uu link according to the disclosure;

FIG. 3b shows a schematic diagram illustrating an exemplary CPP request via sidelink, unicast to neighboring UE according to the disclosure;

FIGS. 4a and 4b show different power diagrams illustrating Examples of multi-path components (MPCs);

FIGS. 5a and 5b show schematic diagrams illustrating Examples of feedback signal payload of CPP-RXs according to the disclosure:

DETAILED DESCRIPTION OF EMBODIMENTS

Figure 1:
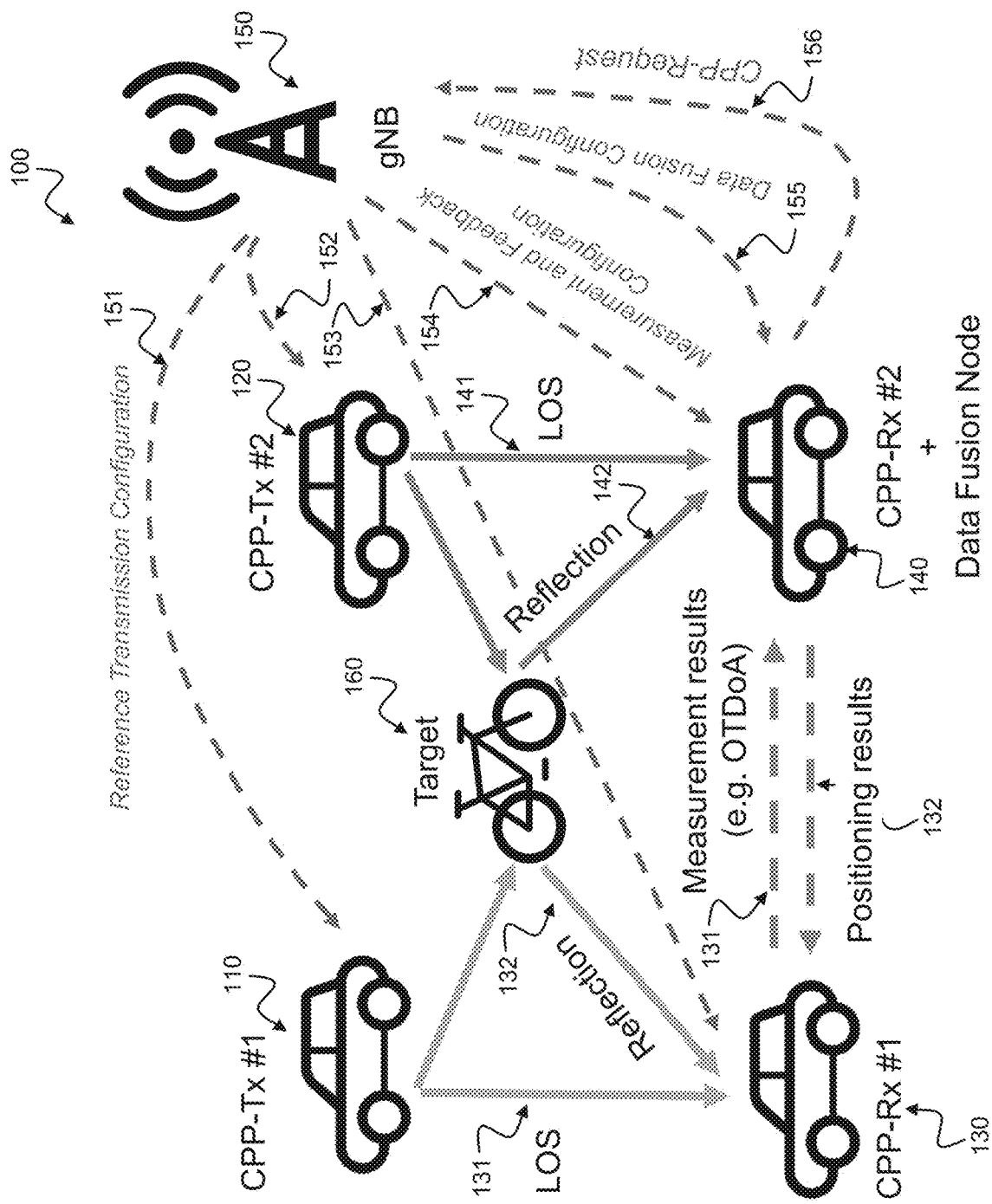
FIG. 1 shows a schematic diagram 100 illustrating an exemplary CPP scenario, including the roles, the radio signals, and the request/configuration signaling according to the disclosure.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may particularly be implemented in wireless communication networks based on 5G NR (New Radio) mobile communication standards and beyond.

The methods, devices and systems described herein may also be implemented in wireless communication networks based on mobile communication standards such as LTE, in particular 3G, 4G and 4.5G. The methods, devices and systems described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. In the following description, the term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

FIG. 1 shows a schematic diagram 100 illustrating an exemplary CPP scenario, including the roles, the radio signals, and the request/configuration signaling according to the disclosure.

A group of network devices, including one or more of transmitters (CPP-Tx) 110, 120, one or more receivers (CPP-Rx) 130, 140 and one or more base stations 150 is involved in a cooperative passive positioning (CPP) operation as described in this disclosure for detecting a target object 160, e.g. a bicycle. Each network device may act as CPP-TX, i.e. transmitter sending reference signal for CPP; CPP-Rx, i.e. receiver receiving reference signal(s) for CPP and performing certain measurements (e.g. OTDoA) and CPP-DFN, i.e. data fusion node that computes the targets positions based on (multiple) measurements. The network devices may be user equipments (UEs), e.g. installed in cars 110, 120, 130, 140 or base stations 150.

The Cooperative Passive Positioning (CPP) Operation is an operation coordinated by the network or among neighboring UE's. This procedure is either initiated by the network or is started on request of an iUE. This procedure involves CPP-Tx's 110, 120, the CPP-Rx's 130, 140, and DFN's 140. First, the CPP-Tx's 110, 120 transmit CPP reference signals (radio signals). The transmission of reference signals can be Single Point to Multi-Point (SP2MP), MP2SP, MP2MP or SP2SP. The transmitted signals are then received by the CPP-Rx's 130, 140. Based on such received reference signals, the CPP-Rx's 130, 140 perform parameter estimation, such as OTDoA, OADoA, OADoD and received power. Such parameters are then used by the DFN's 140 to detect and position the targets.

The purpose of the reference signal transmission is the illumination (i.e. scanning with radio signal) of certain areas so that targets in that area can be detected and positioned based on the corresponding received signals. The possible options for the configuration of the reference signal include: Beamforming/multi-antenna configuration: (Quasi-)omnidirectional/Beamformed transmission, beam codebook; Resource of reference signal: Frequency (e.g. subband), time, code. To facilitate the implementation, existing reference signals, e.g. PRS, CSI-RS, etc. can be reused for CPP operation.

There are three types of configurations involved in a CPP operation: Reference Transmission Configuration (Tx-Conf.) 151, 152, Measurement and Feedback Configuration (MF-Conf.) 153, 154 and Data Fusion Configuration (DF-Conf.) 155.

In Reference Transmission Configuration (Tx-Conf.) 151, 152, the network or a coordinating UE configures the transmission of the reference signals for CPP purpose. The corresponding configuration message may contain the following information: Transmitting node ID's, resource and beamforming configuration of the reference (incl. Tx power control per beam) for each Tx node, type of reference (CSI-RS, PRS, etc.).

In Measurement and Feedback Configuration (MF-Conf) 153, 154, the network or a coordinating UE configures for each CPP-Rx 130, 140:
  The sets of radio resources (e.g. in terms of PRB, Physical Resource Block) to be measured;
  A threshold for identifying MPC's: From the received reference signal of each resource set, the Rx should extract the MPC's of the radio propagation channel. Only the MPC's with power above this threshold should be taken into account for the estimation/measurement of parameters such as OTDoA etc.;

The parameters to be measured from each set of resource, such as: Time delay difference between the strongest MPC (LOS) and each other MPC (OTDoA); AoA difference between the strongest MPC (LOS) and each other MPC (OADoA); Optional: Resource indexes of reference signal containing the MPC's above the threshold, for estimation of OADoD; Rx power (e.g. RSRP) of reference signal containing the MPC's; Optional: The Rx power different between the strongest MPC (i.e. LOS) and the other MPC's;

The feedback destinations and corresponding content (the measured parameters and the corresponding resource set index);

Optional: Configure to compute the target positions based on the above measurements, where the target position can be in terms of GPS coordinate, relative position (e.g. offset from a known position) etc.;

Optional: Configure to directly feedback the estimated radio channel (e.g. impulse/frequency response), so that the DFN can measure the required parameters based on it;

Optional: Configure the CPP-Rx to feedback its own position to DFN's.

In Data Fusion Configuration (DF-Conf.) 155, the network or a coordinating UE configures a node to become DFN. The DFN obtains the measurement results (OTDoA etc.) from CPP-Rx's and compute the position of identified targets. For this purpose, DFN needs to know the corresponding Tx position of each measurement result and the Rx position. Thus, the network or a coordinating UE informs the DFN about: Mapping between radio resource sets (relevant to the DFN) and Tx antenna ports; Position information of each Tx antenna port; Position information of relevant CPP-Rx's (This is not necessary, if CPP-Rx's are configured to report own positions to the DFN); The network or a coordinating UE configures the destination(s) for sharing the data fusion results.

In the example of FIG. 1, CPP-Tx #1, 110 transmits LOS (line of sight) signal 131 and reflection signal 132 to CPP-Rx #1, 130. Reflection signal 132 is reflected by the target object 160 and reflected to CPP-Rx #1, 130 while LOS signal 131 is transmitted directly to CPP-Rx #1, 130. CPP-Tx #2, 120 transmits LOS (line of sight) signal 141 and reflection signal 142 to CPP-Rx #2, 140. Reflection signal 142 is reflected by the target object 160 and reflected to CPP-Rx #2, 140 while LOS signal 141 is transmitted directly to CPP-Rx #2, 140. CPP-Rx #2, 140 acts as data fusion node which receives measurement results (e.g. OTDoA) 131 from CPP-Rx #1, 130 and transmits positioning results 132 back to CPP-Rx #1, 130.

The base station 150 transmits reference transmission configuration 151, 152 to CPP-Tx #1, 110 and CPP-Tx #2, 120. The base station 150 transmits measurement and feedback configuration 153, 154 to CPP-Rx #1, 130 and CPP-Rx #2, 140.

The base station 150 transmits data fusion configuration 155 to CPP-Rx #2, 140 and receives CPP-Request 156 from CPP-Rx #2, 140.

Each network device 110, 120, 130, 140, 150 of the group of network devices involved in cooperative passive positioning, CPP, operation can be used for detecting and positioning at least one target object 160. Each network device 110, 120, 130, 140, 150 may be configured to apply an operation mode from one or more of the following operation modes: initiating network device 140 for initiating a CPP measurement 156, transmitting network device 110, 120 for transmitting a radio signal to scan for an environment of the network device, receiving network device 130, 140 for receiving a reflection signal 132, 142 based on a reflection of the radio signal from the at least one target object 160, and data fusion network device 140 for detecting and positioning the at least one target object 160 based on the reflection signal 132, 142 and/or a Line-of-Sight signal 131, 141.

Each network device, in the example of FIG. 1, the CPP-Rx #2, 140 may be configured to transmit a CPP request 156 for initiating a CPP measurement with a second network device of the group of network devices, e.g. with CPP-Tx #1, 110 or CPP-Tx #2, 120. The CPP request 156 comprises information about a search area for cooperatively detecting and locating the at least one target object 160, when the operation mode is applied as initiating network device, e.g. for CPP-Rx #2, 140 shown in FIG. 1.

The CPP request 156 may comprise information about an illumination by the transmitted radio signal, in particular about a general illumination or a partial illumination of neighborhood areas of the transmitting network device, e.g. CPP-Tx #1, 110 or CPP-Tx #2, 120.

The network device 140 may be configured to transmit the CPP request 156 to a base station 150 via uplink (as shown in FIG. 1) or alternatively to a neighboring UE, e.g. CPP-Tx #1, 110 or CPP-Tx #2, 120 via sidelink (not shown in FIG. 1). The network device 140 may indicate whether the network device or the neighboring UE shall transmit reference signals when transmitting the CPP request via the sidelink. The network device 140 may receive a confirmation message or a rejection message from the base station 150 (not shown in FIG. 1) after transmitting the CPP request 156 via the uplink.

A network device operating as transmitting network device, e.g. CPP-Tx #1, 110 or CPP-Tx #2, 120 may receive a reference transmission configuration (Tx-Conf) 151, 152 indicating a reference signal configuration.

The reference transmission configuration 151, 152 comprises information about transmitting node IDs, a resource and beamforming configuration of the reference signals and/or a type of the reference signals for each transmitting network device 110, 120.

A network device operating as receiving network device, e.g. CPP-Rx #1, 130 or CPP-Rx #2, 140 may receive a measurement and feedback configuration (MF-Conf) 153, 154, indicating a measurement and feedback configuration.

The measurement and feedback configuration 153, 154 comprises information about a threshold for extracting multipath components, parameters to be measured, in particular a received power to be measured by the receiving network device 120, 140 and/or one or more destination network devices for sending feedback. The parameters to be measured may be for example: Observed Time Difference of Arrival. OTDoA, Observed Angular Difference of Arrival, OADoA, Observed Angular Difference of Departure, OADoD, with respect to Line-of-Sight, LOS 131, 141, and reflection 132, 142 among the multi-path components of the transmitted radio signal. Measurement and use of these parameters is described below with respect to FIG. 2. A set of the parameters to be measured, in particular a set of OTDoA, OADoA, OADoD, can correspond to one transmitting network device, e.g. to 110 or to 120.

A network device operating as receiving network device, e.g. CPP-Rx #1, 130 or CPP-Rx #2, 140 be configured to receive information from a network device of the group of network devices operating as transmitting network device, e.g. from CPP-Tx #1, 110 or CPP-Tx #2, 120. The information may include an angular of departure, AoD, difference between different radio resources used to transmit a reference signal.

The receiving device, e.g. CPP-Rx #1, 130 or CPP-Rx #2, 140 may be configured to feedback a measured received signal of at least a subset of transmitted beamformed signals. A corresponding transmitting device, e.g. CPP-Tx #1, 110 or CPP-Tx #2, 120 may be configured to estimate the AoD difference based on the feedback.

A network device operating as data fusion network device, e.g. CPP-Rx #2, 140 may be configured to receive a data fusion configuration (DF-Conf) 155, indicating a processing of measurement results. The data fusion configuration 155 comprises: information about measurement results from the one or more receiving network devices 130, 140, information about a location of the one or more transmitting network devices 110, 120 and the one or more receiving network devices 130, 140 and information about a mapping between the measurement results and the location of the one or more transmitting network devices 110, 120 and the one or more receiving network devices 130, 140.

Each network device may be configured to apply the operation mode of the network device with network coordination, in particular according to Mode 3 of the LTE-Vehicle standard: or apply the operation mode of the network device in the CPP network without network coordination, in particular according to Mode 4 of the LTE-Vehicle standard.

A network device operating as receiving network device 130, 140 may be configured to report a number of target objects 160 above a maximum configured number of target objects or a number of identified target objects 160 to a network, in particular to a base station 150. The network device may configure a message in which the number of detected target objects is reported.

A network device operating as transmitting network device 110, 120 may be configured to enhance power and/or radio resources of signal components, in particular beams, of the radio signal pointing in other directions than a line-of-sight. LOS, direction towards a receiving network device 130, 140.

A network device operating as transmitting network device 110, 120 may be configured as network device operating as receiving network device and vice versa for a next reference signal transmission.

FIGS. 2a, 2b and 2c show different approaches for obtaining target position via CPP according to the disclosure.

There are several approaches for obtaining the target position via CPP, depending on which parameters can be measured and how many CPP-Tx's are available. The first approach 200a depicted in FIG. 2a is pure OTDoA estimation based. The CPP-Rx's 130 measure only the OTDoA. From the OTDoA measure corresponding to one Tx (source), e.g. Tx #2, 120 as shown in FIG. 2a, an ellipse around the Rx 130 can be computed, which corresponds to the possible target positions. From another OTDoA measurement, either with a different Tx, e.g. Tx #1, 110, or a different Rx, e.g. Rx 140 (not shown in FIG. 2a), another ellipse can be drawn. The crossing points of both ellipses are the reduced possible position of the targets 160. This approach requires at least two Tx's 110, 120 (as shown in FIG. 2a) or two Rx's.

The second approach 200b depicted in FIG. 2b is OTDoA+OADoA estimation based. From the OTDoA, an ellipse can be computed as mentioned above. From the OADoA 201, a line can be drawn from the Rx 130 towards the target 160. The crossing point is then the possible position of the target 160. This approach works with at minimum one Tx 110 and one Rx 130 (as shown in FIG. 2b).

The third approach (not depicted) is OTDoA+OADoD estimation based. From the OTDoA, an ellipse can be computed as mentioned above. From the OADoD 201, a line can be drawn from the Tx 110 towards the target 160. The crossing point is then the possible position of the target 160. This approach works with at minimum one Tx 110 and one Rx 130.

The fourth approach 200c depicted in FIG. 2c is OADoA+OADoD estimation based. From the OADoA 201, a line can be drawn from the Rx 130 towards the target 160. From the OADoD 202, a line can be drawn from the Tx 110 towards the target 160. The crossing point is then the possible position of the target 160. This approach works with at minimum one Tx 110 and one Rx 130.

FIGS. 3a and 3b show schematic diagram illustrating exemplary CPP requests 300a, 300b via uu link (see FIG. 3a) or via sidelink (see FIG. 3b), unicast to neighboring UE.

The CPP request 300a via uu link includes different data fields: Cooperative Beam/Resource Sweeping request 301, iUE ID 302, iUE position (optional) 303, BF capability (e.g. number of beams, etc) 304, general or partial illumination 305, if partial illumination: Area for illumination (e.g. position offset and radius)/rough position of already identified targets (optional) 306, list of neighboring UE IDs 307 (optional), preferred panel of each neighboring UE 308 (optional).

The CPP request 300b via sidelink includes different data fields: Cooperative Beam/Resource Sweeping request 311, iUE ID 312, iUE position (optional) 313, iUE transmits reference (0) or neighboring UE transmits reference (1) 314, preferred panel for CPP-ref. transmission/reception 315, preferred resource for CPP-reference transmission/reception 316 and others 317.

The CPP Request is a request for cooperatively detecting and positioning the targets 160 in the environment of the UE, i.e. for starting a CPP operation. This request can be sent by an initiating UE (iUE) to network (via uu link) as shown in FIG. 3a, e.g. as described above with respect to FIG. 1 for CPP request 156 or to the neighborhood UE's (via sidelink) as shown in FIG. 3b. Specifically, if the communication system supports beamforming, cooperative beam sweeping is requested.

In the CPP request, two types of environment illumination 305 (via radio signal) can be specified: General illumination, i.e. all neighborhood areas of the iUE should be illuminated by the transmitted reference signals; and Partial illumination, i.e., the iUE specifies a certain area that should be illuminated by the transmitted reference signals. The specification can, e.g. be via absolute position or relative position, e.g. orientation, distance, beam resource of iUE or the BS (beam resource can be translated to orientation information), etc.

If the request is sent via the sidelink (as shown in FIG. 3b), the iUE can indicate (field 314) whether iUE or the neighboring UE should transmit the reference signals (for illumination purpose). Further, the iUE can indicate (field 316) the preferred resource (incl. beams, antenna panels) for reference signal transmission (either by iUE or by a neighboring UE). When the CPP operation is initiated by the network, no CPP request is necessary.

FIGS. 4a and 4b show different power diagrams illustrating Examples of multi-path components (MPCs). A power diagram for pure OTDoA based scenario (e.g. as described with respect to FIG. 2a) is depicted in FIG. 4a. The LOS signal 401 (e.g. corresponding to 131 or 141 depicted in FIG. 1) and the reflection signal 402 (e.g. corresponding to 132 or 142 depicted in FIG. 1) have a delay difference 403 with respect to each other. Both signals 401, 402 are above a power threshold 404.

A power diagram for OTDoA+OADoA based scenario (e.g. as described with respect to FIG. 2b) is depicted in FIG. 4b. The LOS signal 401 (e.g. corresponding to 131 or 141 depicted in FIG. 1) and the reflection signal 402 (e.g. corresponding to 132 or 142 depicted in FIG. 1) are illustrated over AoA axis and time (delay) axis. Both signals 401, 402 are above a power threshold 404.

With respect to an OADoD Measurement, a CPP-Rx cannot measure the OADoD without knowing the angular of departure (AoD) difference between different radio resources used to transmit the reference signal. This information is usually only known at the Tx. Thus, there are different ways of providing the OADoD to the DFN:

In a first way, the Tx informs the Rx about the AoD relations between different radio resources used to transmit the reference signal. Based on such information and the received reference signal, the Rx can measure the OADoA and send to DFN. In a second way, the Rx feeds back to the Tx the radio resource indexes corresponding to the strongest received signals. Based on this, the Tx performs the OADoA estimation and sends it to the DFN (either directly or via the Rx node). Optionally, the Tx also sends the antenna configuration information to the Rx, e.g. the number of antenna elements, inter-element distance, etc., so that the Rx can perform high resolution AoD estimation. Optionally, the Rx feeds back to the Tx the measured complex gain of the channel of each resource (e.g. corresponding to a beam direction) of the reference signal, so that the Tx can perform high resolution AoD estimation.

FIGS. 5a and 5b show schematic diagrams illustrating Examples of feedback signal payload 500a, 500b of CPP-RXs according to the disclosure.

FIG. 5a references to the pure OTDoA based scenario as shown above with respect to FIG. 4a. The feedback signal payload 500a includes the following data fields: a resource set #1, 501 with OTDoA #1, 502 and OTDoA #2, 503 and a resource set #2, 504 with OTDoA #1, 505 and OTDoA #2, 506.

FIG. 5b references to the OTDoA+OADoA based scenario as shown above with respect to FIG. 4b. The feedback signal payload 500b includes the following data fields: a resource set #1, 511 with OTDoA #1, 512, OADoA #1, 513, OTDoA #2, 514 and OADoA #2, 515 and a resource set #2, 516 with OTDoA #1, 517 and OADoA #1, 518.

Depending on the environment, the number of detected targets is always changing. However, usual signaling only supports the feedback of a fixed number of parameters. This disclosure introduces methods to cope with this problem as described in the following.

According to a first method, the BS configures a maximum number (N1) of targets to be reported in the feedback. If the actual number of detected targets (Na) is larger than N1, the CPP-Rx informs the BS about the additional number of detected targets. Then the BS allocates further feedback resource for such targets. To realize this method, the following configurations are used: BS configures a feedback message to be sent by the CPP-Rx to inform whether Na>N1 (1 bit flag) or directly the value (Na−N1) if (Na>N1); BS configures further feedback resource for the CPP-Rx to feedback the parameters of additional targets to the DFN's; BS also configures the feedback resource of Data Fusion nodes accordingly, for reporting the position of the detected targets to the network.

According to a second method, the BS configures a feedback message for the CPP-Rx to report the number of identified MPC's. Afterwards, the BS allocates the feedback resource between CPP-Rx and DFN's accordingly.

The reflection signal may be much weaker than the LOS signal. Thus, for better illumination of the target and better positioning accuracy of the target, the reflection signal energy may be enhanced, e.g. by allocating more power and/or more radio resource (incl. frequency and time).

In a first case, before any target is detected, a CPP-Tx's can be configured to use more power and/or more radio resource for transmitting reference signals in other directions than that in the LOS direction towards an Rx.

In a second case, one or more targets are already roughly identified based on previous reference signals. The following cases A. B and C are further distinguished.

In case A, the iUE is the Rx of the reference signal. In this case, the iUE sends a request to the BS and requests for reflection enhancement. BS confirms the request and sends back the Tx/Rx-Config. Signaling to the CPP-Tx/Rx with enhanced power/more radio resource for the reflection signal.

In case B, the iUE is the Rx of the reference signal. In this case, the iUE sends a request to the CPP-Tx and requests for reflection enhancement. CPP-Tx confirms the request and sends back Rx-Config. Signaling according to the enhanced power and/or increased resource of the reflection signal.

In case C, the UE is the Tx of the reference signal. The iUE requests the Rx to feedback the measured power on the LOS and reflection signals, e.g. via the Rx-Config. Signaling.

In CPP scenarios, Reverse Transmission can be configured. Reverse transmission means that right after a CPP-Tx (node 1) and a CPP-Rx (node 2) have performed a reference signal transmission, both exchange their role in the next reference transmission, i.e. the original Tx (node 1) becomes Rx, while the original Rx (node 2) becomes Tx. However, in this next reference transmission, only radio resources of previous reference signals containing sufficient Rx power (implying a possible target) are used for transmission. First, node 2 sends a CPP-Rx configuration to node 1 to inform node 1 the resource that node 2 will use for the reverse transmission. Afterwards, node 2 transmits the reference signal in those resources to node 1.

Reverse transmission has the advantage that the signaling overhead is reduced while more measurements can be obtained for better positioning of the targets.

A reverse transmission can be scheduled by the network or requested by a UE.

Figure 6:
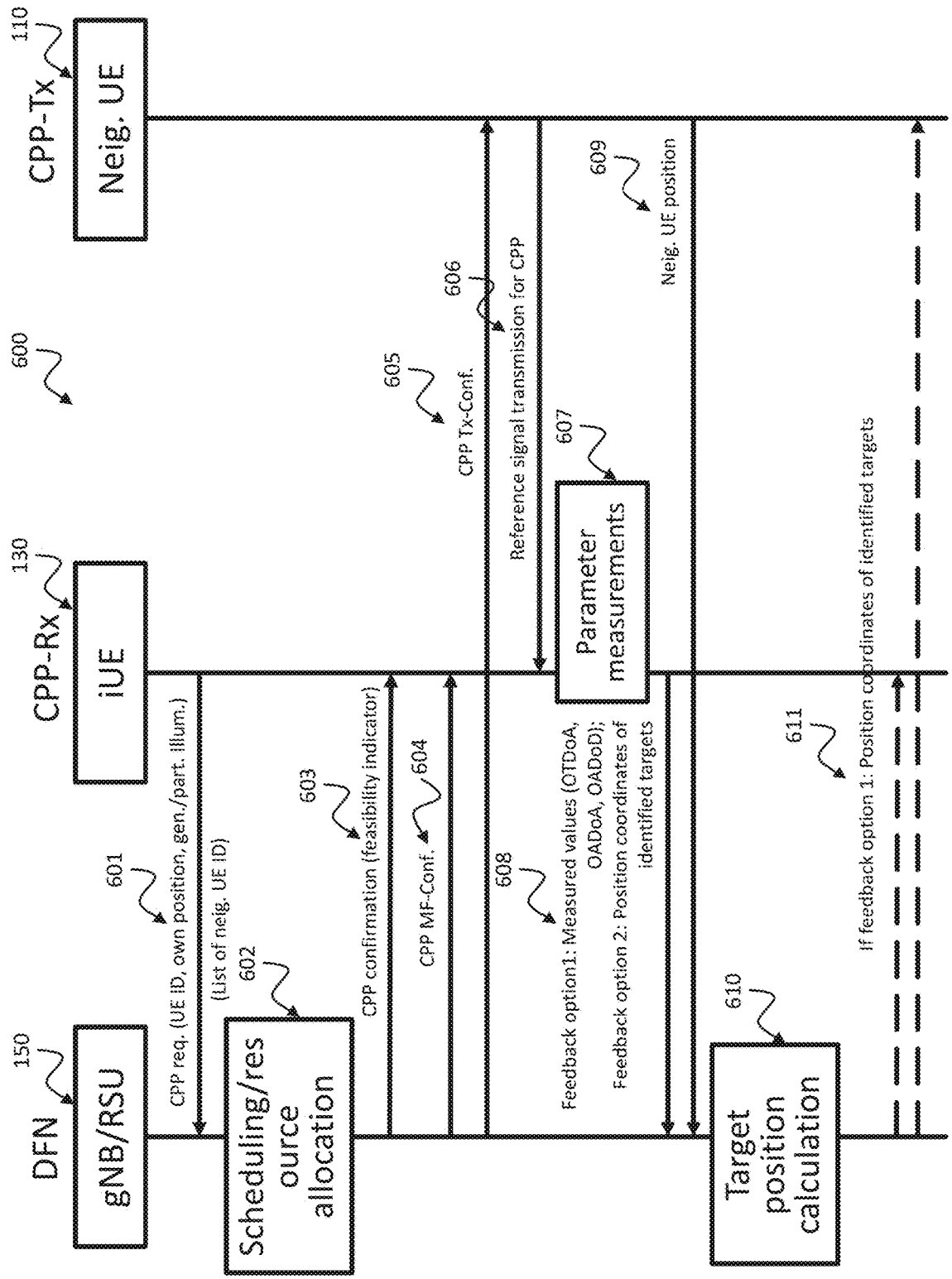
FIG. 6 shows an exemplary signaling flow 600 illustrating an Example of UE initiation of CPP via uu link according to the disclosure.

FIG. 6 shows an exemplary signaling flow 600 illustrating an Example of UE initiation of CPP via uu link according to the disclosure.

In this example a CPP-Rx, e.g. CPP-Rx #1, 130 or CPP-Rx #2, 140 as depicted in FIG. 1 acts as initiating UE and a CPP-Tx, e.g. CPP-Tx #1, 110 or CPP-Tx #2, 120 as depicted in FIG. 1 acts as neighboring UE and a gNB or RSU, e.g. base station 150 as depicted in FIG. 1 acts as data fusion node, DFN. In the beginning, CPP request 601 with parameters UE ID, own position, general/partial illumination, list of neighboring UE IDs, e.g. as described above with respect to FIG. 3 is transmitted from iUE 130 to gNB/RSU 150. Then, gNB/RSU 150 performs scheduling/resource allocation 602 and transmits CPP confirmation 603 with feasibility indicator to iUE 130. gNB/RSU 150 further transmits CPP MF-Conf 604 to iUE 130 and CPP Tx-Conf 605 to neighboring UE 110 which initiates reference signal transmission 606 for CPP towards iUE 130. iUE 130 performs parameter measurements 607 and transmits feedback 608 to gNB/RSU 150 based on feedback option 1, i.e. measured values (OTDoA, OADoA, OADoD) or based on feedback option 2, i.e. position coordinates of identified targets. Neighboring UE 110 further transmits neighboring UE position 609 to gNB/RSU 150. Then, gNB/RSU 150 performs target position calculation 610 and in case of feedback option 1 transmits position coordinates of identified targets 611 to iUE 130 and neighboring UE 110.

Figure 7:
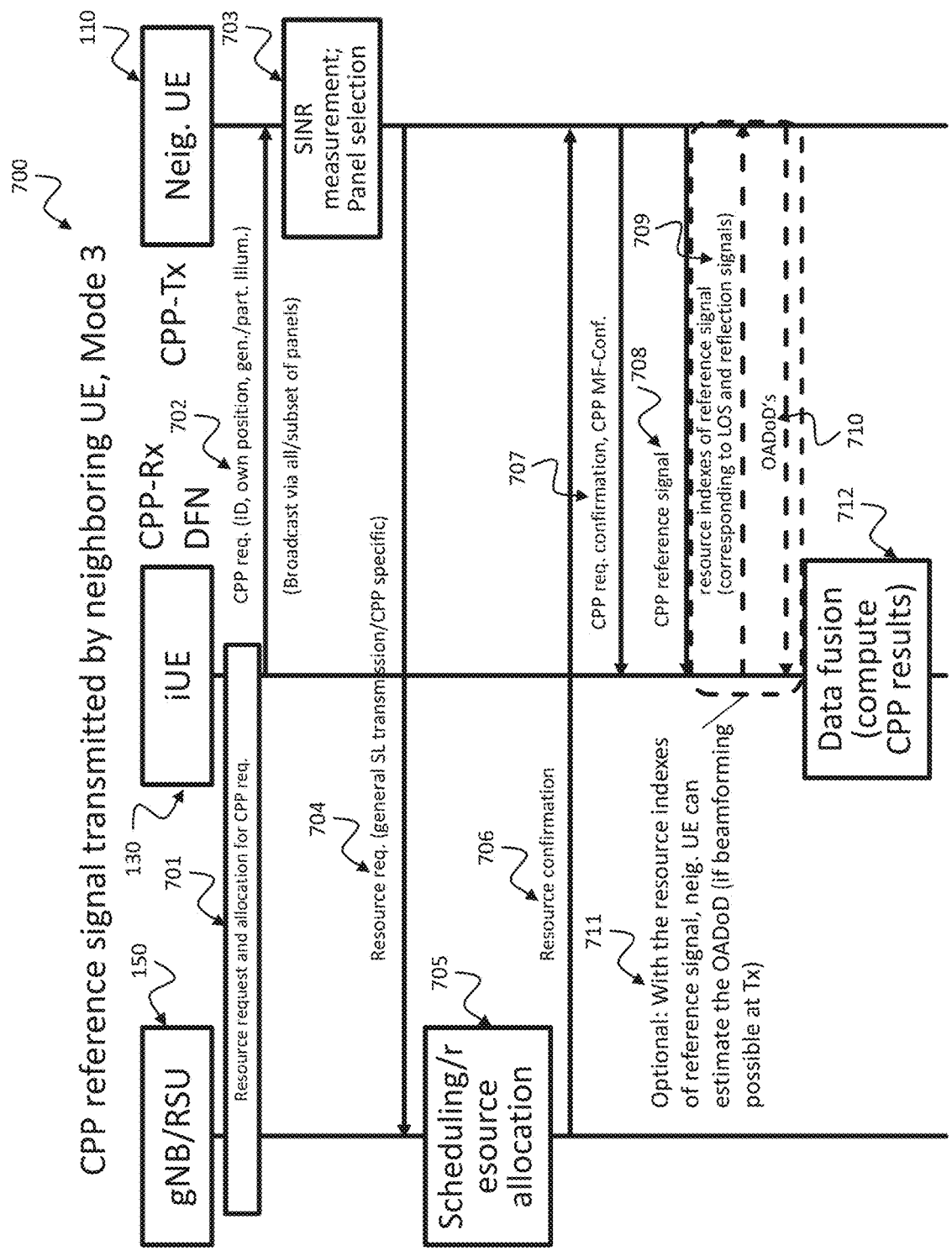
FIG. 7 shows an exemplary signaling flow 700 illustrating an Example of UE initiation of CPP via sidelink, where CPP reference signal is transmitted by neighboring UE with network coordination according to the disclosure.

FIG. 7 shows an exemplary signaling flow 700 illustrating an Example of UE initiation of CPP via sidelink, where CPP reference signal is transmitted by neighboring UE with network coordination according to the disclosure.

In this example a CPP-Rx, e.g. CPP-Rx #1, 130 or CPP-Rx #2, 140 as depicted in FIG. 1 acts as initiating UE and data fusion node (DFN) and a CPP-Tx, e.g. CPP-Tx #1, 110 or CPP-Tx #2, 120 as depicted in FIG. 1 acts as neighboring UE and a gNB or RSU, e.g. base station 150 as depicted in FIG. 1 is used for network coordination. In the beginning, resource request and allocation 701 for CPP request is performed between gNB/RSU 150 and iUE 130. Then, CPP request 702 with parameters ID, own position, general/partial illumination, broadcast via all/subset of panels, e.g. as described above with respect to FIG. 3 is transmitted from iUE 130 to neighboring UE 110. Then, neighboring UE 110 performs SINR (signal to interference and noise ratio) measurement and panel selection 703 and transmits resource request 704 with general SL transmission/CPP specific parameters to gNB/RSU 150. gNB/RSU 150 performs scheduling/resource allocation 705 and transmits resource confirmation 706 to neighboring UE 110 which transmits CPP request confirmation, CPP MF-Conf. 707 to iUE 130. Neighboring UE 110 further transmits CPP reference signal 708 to iUE 130 which reports resource indexes of reference signal 709 (corresponding to LOS and reflection signals) to neighboring UE 110. Neighboring UE 110 transmits OADoDs 710 to iUE 130. Optionally 711, with the resource indexes of reference signal, neighboring UE can estimate the OADoD (if beamforming is possible at Tx). Then data fusion 712 (i.e. compute CPP results) can be performed by iUE 130.

Figure 8:
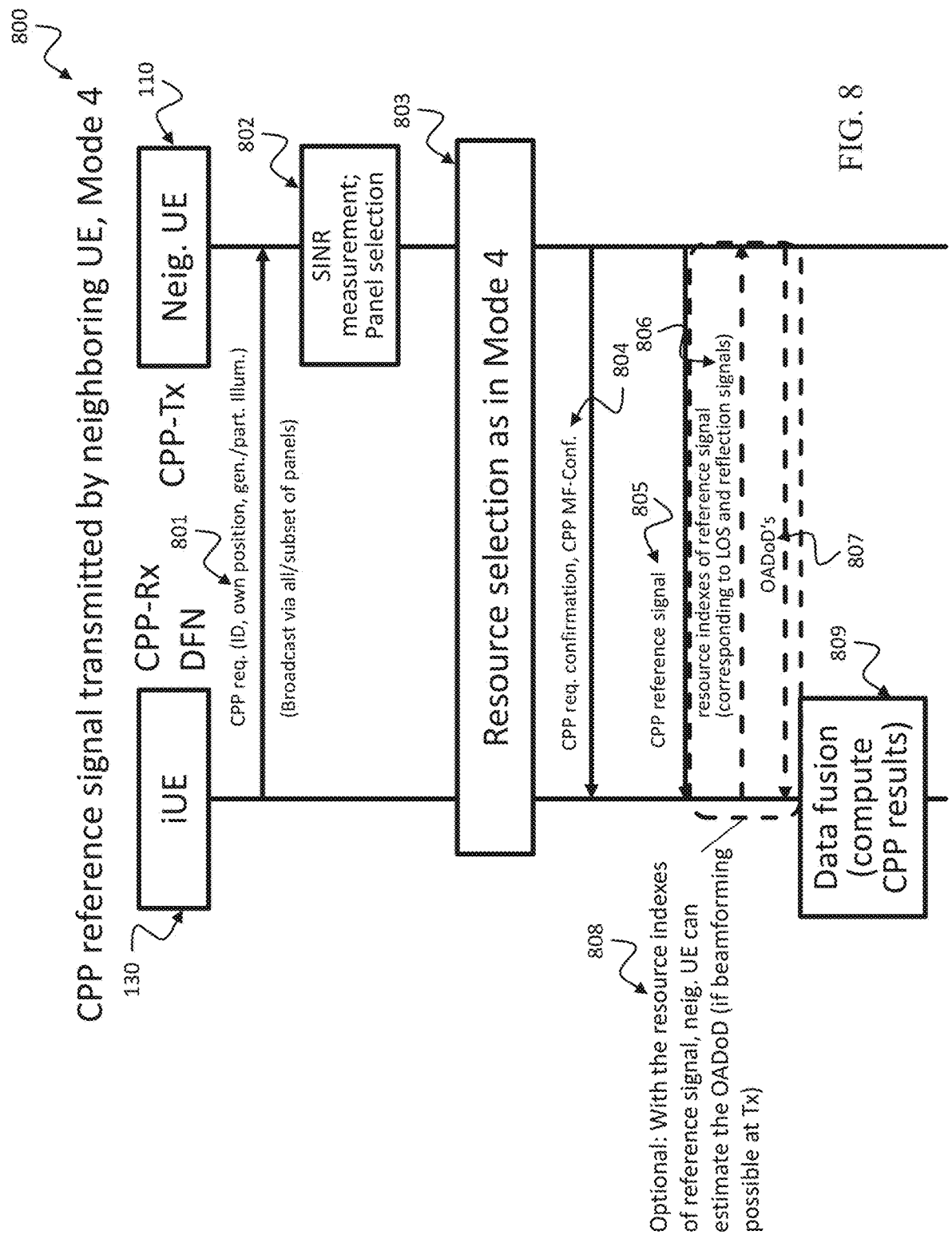
FIG. 8 shows an exemplary signaling flow 800 illustrating an Example of UE initiation of CPP via sidelink, where CPP reference signal is transmitted by neighboring UE without network coordination according to the disclosure.

FIG. 8 shows an exemplary signaling flow 800 illustrating an Example of UE initiation of CPP via sidelink, where CPP reference signal is transmitted by neighboring UE without network coordination according to the disclosure.

In this example a CPP-Rx, e.g. CPP-Rx #1, 130 or CPP-Rx #2, 140 as depicted in FIG. 1 acts as initiating UE and data fusion node (DFN) and a CPP-Tx, e.g. CPP-Tx #1, 110 or CPP-Tx #2, 120 as depicted in FIG. 1 acts as neighboring UE. No network coordination is required because of the sidelink transmission. In the beginning, CPP request 801 with parameters ID, own position, general/partial illumination, broadcast via all/subset of panels, e.g. as described above with respect to FIG. 3 is transmitted from iUE 130 to neighboring UE 110. Then, neighboring UE 110 performs SINR (signal to interference and noise ratio) measurement and panel selection 802 and performs together with iUE 130 resource selection 803 as in mode 4 of the LTE-V standard. Neighboring UE 110 transmits CPP request confirmation, CPP MF-Conf. 804 to iUE 130. Neighboring UE 110 further transmits CPP reference signal 805 to iUE 130 which reports resource indexes of reference signal 806 (corresponding to LOS and reflection signals) to neighboring UE 110. Neighboring UE 110 transmits OADoDs 807 to iUE 130. Optionally 808, with the resource indexes of reference signal, neighboring UE can estimate the OADoD (if beamforming is possible at Tx). Then data fusion 809 (i.e. compute CPP results) can be performed by iUE 130.

Figure 9:
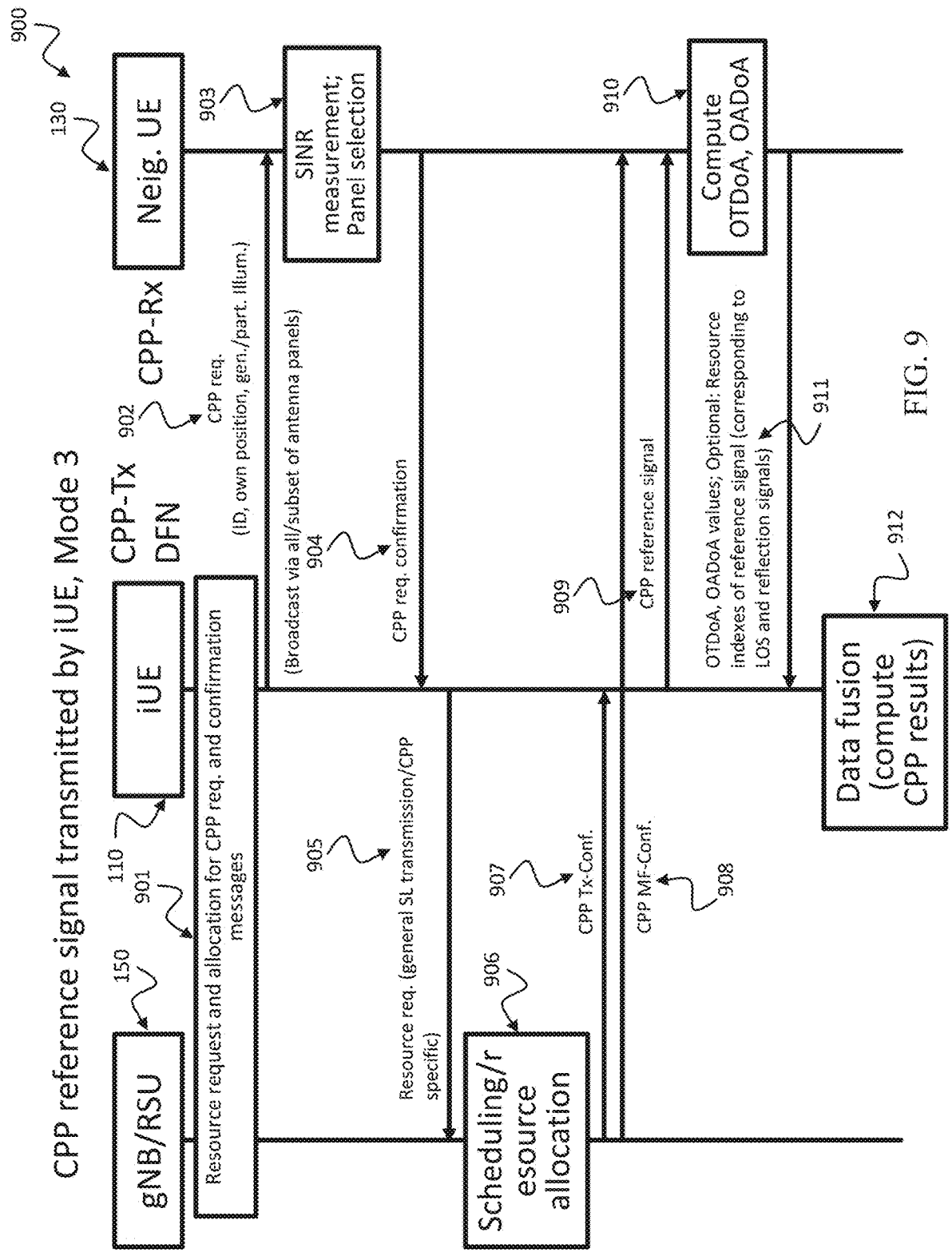
FIG. 9 shows an exemplary signaling flow 900 illustrating an Example of UE initiation of CPP via sidelink, where CPP reference signal is transmitted by iUE with network coordination according to the disclosure.

FIG. 9 shows an exemplary signaling flow 900 illustrating an Example of UE initiation of CPP via sidelink, where CPP reference signal is transmitted by iUE with network coordination according to the disclosure.

In this example a CPP-Tx, e.g. CPP-RT #1, 110 or CPP-Tx #2, 120 as depicted in FIG. 1 acts as initiating UE and data fusion node (DFN) and a CPP-Rx, e.g. CPP-Rx #1, 130 or CPP-Rx #2, 140 as depicted in FIG. 1 acts as neighboring UE and a gNB or RSU, e.g. base station 150 as depicted in FIG. 1 is used for network coordination. In the beginning, resource request and allocation 901 for CPP request and confirmation messages is performed between gNB/RSU 150 and iUE 110. Then, CPP request 902 with parameters ID, own position, general/partial illumination, broadcast via all/subset of antenna panels, e.g. as described above with respect to FIG. 3 is transmitted from iUE 110 to neighboring UE 130. Then, neighboring UE 130 performs SINR (signal to interference and noise ratio) measurement and panel selection 903 and transmits CPP request confirmation 904 to iUE 110 which transmits resource request 905 with general SL transmission/CPP specific parameters to gNB/RSU 150. gNB/RSU 150 performs scheduling/resource allocation 906 and transmits CPP Tx-Conf 907 to iUE 110 and CPP MF-Conf 908 to neighboring UE 130. iUE 110 further transmits CPP reference signal 909 to neighboring UE 130 which performs computation 910 of OTDoA, OADoA. Neighboring UE 130 transmits OTDoA, OADoA values 911 to iUE 110 and optionally resource indexes of reference signal (corresponding to LOS and reflection signal). Then, data fusion 912 (i.e. compute CPP results) can be performed by iUE 110.

Figure 10:
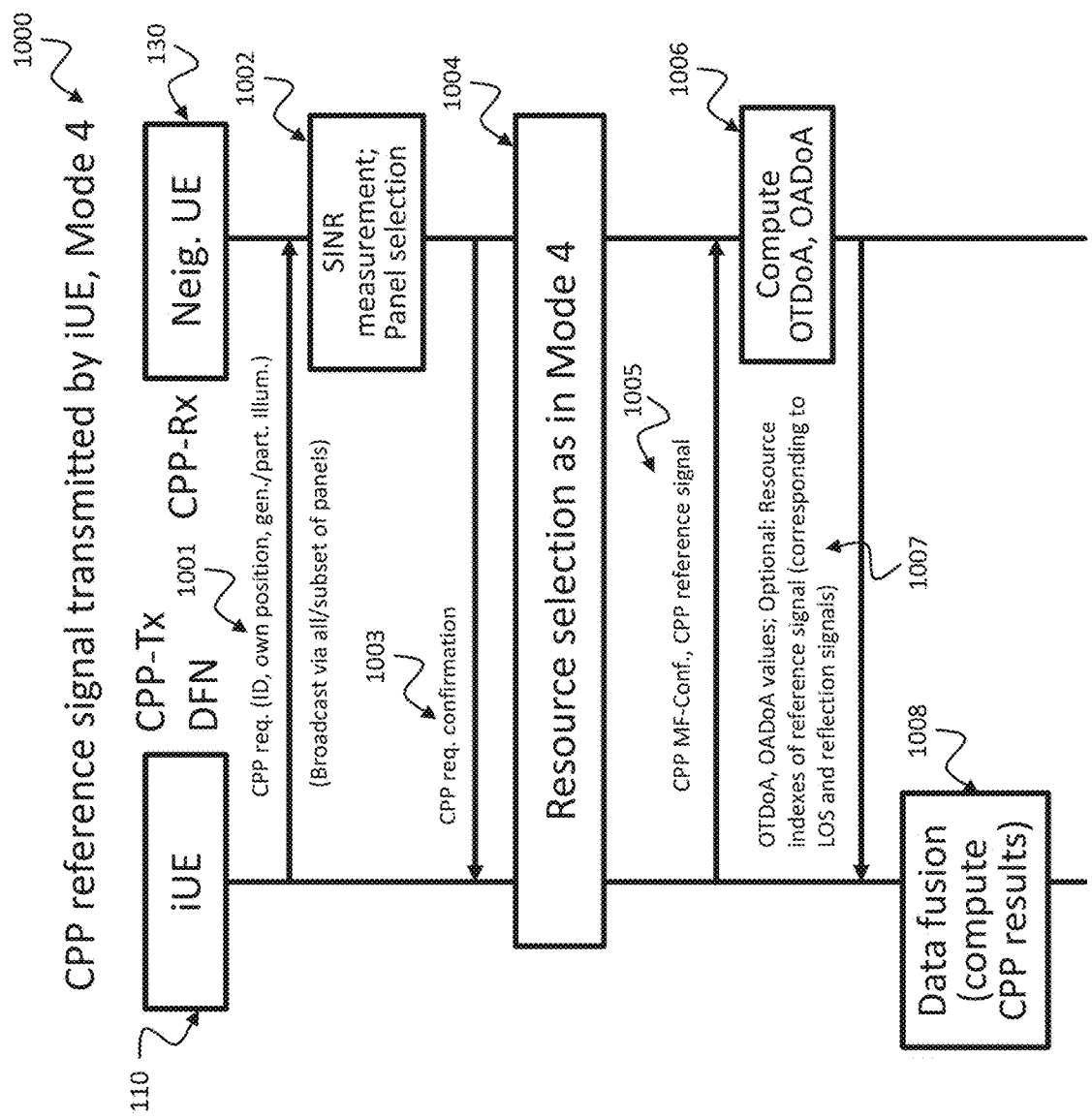
FIG. 10 shows an exemplary signaling flow 1000 illustrating an Example of UE initiation of CPP via sidelink, where CPP reference signal is transmitted by iUE without network coordination according to the disclosure.

FIG. 10 shows an exemplary signaling flow 1000 illustrating an Example of UE initiation of CPP via sidelink, where CPP reference signal is transmitted by iUE without network coordination according to the disclosure.

In this example a CPP-Tx, e.g. CPP-Tx #1, 110 or CPP-Tx #2, 120 as depicted in FIG. 1 acts as initiating UE and data fusion node (DFN) and a CPP-Rx, e.g. CPP-Rx #1, 130 or CPP-Rx #2, 140 as depicted in FIG. 1 acts as neighboring UE. No network coordination is required because of the sidelink transmission. In the beginning, CPP request 1001 with parameters ID, own position, general/partial illumination, broadcast via all/subset of panels, e.g. as described above with respect to FIG. 3 is transmitted from iUE 110 to neighboring UE 130. Then, neighboring UE 130 performs SINR (signal to interference and noise ratio) measurement and panel selection 1002, reports CPP request confirmation 1003 to iUE 110 and performs together with iUE 130 resource selection 1004 as in mode 4 of the LTE-V standard. iUE 110 transmits CPP reference signal and CPP MF-Conf 1005 to neighboring UE 130. Neighboring UE 110 performs computation 1006 of OTDoA, OADoA and transmits OTDoA, OADoA values 1007 to iUE 110. Optionally, resource indexes of reference signal (corresponding to LOS and reflection signal) are transmitted to iUE 110. Then, data fusion 1008 (i.e. compute CPP results) can be performed by iUE 110.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

The invention claimed is:

1. A network device of a group of network devices involved in a cooperative passive positioning (CPP) operation comprising at least two network devices for detecting and positioning at least one target object, wherein the network device is configured to:
apply an operation mode from one or more of an initiating network device mode, a transmitting network device mode, a receiving network device mode, and a data fusion network device mode, wherein:
the network device in the initiating network device mode is configured to initiate a CPP measurement,
the network device in the transmitting network device mode is configured to transmit a radio signal to scan for an environment of the network device,
the network device in the receiving network device mode is configured to receive a radio signal reflected from the at least one target object, and
the network device in the data fusion network device mode is configured to detect and position the at least one target object based on at least one of a reflection signal or a Line-of-Sight (LOS) signal; and
receive a measurement and feedback configuration (MF-Conf) indicating a measurement and feedback configuration when the operation mode is applied as receiving network device, wherein the MF-Conf comprise information about a threshold for extracting multipath components and parameters to be measured, wherein the parameters to be measured includes at least one of a received power to be measured by the receiving network device and one or more destination network devices for sending feedback, and wherein the parameters to be measured are from one or a combination of the following: Observed Time Difference of Arrival (OTDoA), Observed Angular Difference of Arrival (OADoA), and Observed Angular Difference of Departure (OADoD), with respect to LOS and reflection among multi-path components of the transmitted radio signal.

2. The network device of claim 1, wherein the network device is configured to:
transmit a CPP request for initiating a CPP measurement with a second network device of the group of network devices, the CPP request comprising information about a search area for cooperatively detecting and locating the at least one target object, when the operation mode is applied as initiating network device.

3. The network device of claim 2, wherein the CPP request comprises information about an illumination by the transmitted radio signal, and wherein the illumination includes a general illumination or a partial illumination of neighborhood areas of a transmitting network device.

4. The network device of claim 2, wherein the network device is configured to:
transmit the CPP request to a base station via uplink or to a neighboring UE via sidelink;
indicate whether the network device or the neighboring UE shall transmit reference signals when transmitting the CPP request via the sidelink; and
receive a confirmation message or a rejection message from the base station after transmitting the CPP request via the uplink.

5. The network device of claim 1, wherein the network device is configured to:
receive a reference transmission configuration (Tx-Conf) indicating a reference signal configuration, when the operation mode is applied as the transmitting network device.

6. The network device of claim 5, wherein the Tx-Conf comprises information about transmitting node IDs, a resource and beamforming configuration of reference signals, or a type of the reference signals for each transmitting network device.

7. The network device of claim 1, wherein a set of the parameters to be measured, including a set of OTDoA, OADOA, and OADoD, corresponds to one transmitting network device.

8. The network device of claim 7, wherein the network device operating as receiving network device is configured to receive information from a second network device of the group of network devices operating as transmitting network device, and wherein the information is about an angular of departure (AoD) difference between different radio resources used to transmit a reference signal.

9. The network device of claim 8, wherein the receiving network device is configured to feedback a measured received signal of at least a subset of transmitted beamformed signals, and wherein the transmitting network device is configured to estimate the AoD difference based on the feedback.

10. The network device of claim 1, wherein the network device is configured to:
receive a data fusion configuration (DF-Conf) indicating a processing of measurement results, when the operation mode is configured as the data fusion network device.

11. The network device of claim 10, wherein the DF-Conf comprises:
information about measurement results from one or more receiving network devices,
information about a location of one or more transmitting network devices and the one or more receiving network devices, and
information about a mapping between the measurement results and the location of the one or more transmitting network devices and the one or more receiving network devices.

12. The network device of claim 1, wherein the network device is configured to:
apply the operation mode of the network device with network coordination according to Mode 3 of the LTE-Vehicle standard; or
apply the operation mode of the network device in the CPP network without network coordination according to Mode 4 of the LTE-Vehicle standard.

13. The network device of claim 1, wherein the network device operating as receiving network device is configured to report a number of target objects above a maximum configured number of target objects or a number of identified target objects to a network.

14. The network device of claim 13, wherein the network device is configured to:
configure a message in which the number of detected target objects is reported.

15. The network device of claim 1, wherein the network device operating as transmitting network device is configured to enhance at least one of power or radio resources of signal components.

16. The network device of claim 1, wherein a network device operating as a transmitting network device is configured as a network device operating as a receiving network device and vice versa for a next reference signal transmission.

17. A non-transitory storage medium, wherein the storage medium includes computer executable code or computer executable instructions that, when executed, causes at least one computer to execute a method for configuring a network device of a group of network devices involved in a cooperative passive positioning (CPP) operation comprising at least two network devices for detecting and positioning at least one target object, wherein the method comprises:
applying an operation mode from one or more of an initiating network device mode, a transmitting network device mode, a receiving network device mode, and a data fusion network device mode, wherein:
the network device in the initiating network device mode initiates a CPP measurement,
the network device in the transmitting network device mode transmits a radio signal to scan for an environment of the network device,
the network device in the receiving network device mode receives a radio signal reflected from the at least one target object, and
the network device in the data fusion network device mode detects and positions the at least one target object based on at least one of a reflection signal or a Line-of-Sight (LOS) signal; and
receive a measurement and feedback configuration (MF-Conf) indicating a measurement and feedback configuration when the operation mode is applied as receiving network device, wherein the MF-Conf comprise information about a threshold for extracting multipath components and parameters to be measured, wherein the parameters to be measured includes at least one of a received power to be measured by the receiving network device and one or more destination network devices for sending feedback, and wherein the parameters to be measured are from one or a combination of the following: Observed Time Difference of Arrival (OTDoA), Observed Angular Difference of Arrival (OADoA), and Observed Angular Difference of Departure (OADoD), with respect to LOS and reflection among multi-path components of the transmitted radio signal.

18. A communication method, wherein the method is applied to a network device of a group of network devices involved in a cooperative passive positioning (CPP) operation comprising at least two network devices for detecting and positioning at least one target object, the method comprising:
initiating a CPP measurement;
transmitting a CPP request for initiating the CPP measurement with a second network device of the group of network devices, the CPP request comprising information about a search area for cooperatively detecting and locating the at least one target object, wherein the CPP request comprises information about an illumination by a transmitted radio signal, and wherein the illumination includes a general illumination or a partial illumination of neighborhood areas of a transmitting network device; and
receiving a measurement and feedback configuration (MF-Conf) indicating a measurement and feedback configuration, wherein the MF-Conf comprise information about a threshold for extracting multipath components and parameters to be measured, wherein the parameters to be measured includes at least one of a received power to be measured by a receiving network device and one or more destination network devices for sending feedback, and wherein the parameters to be measured are from one or a combination of the following: Observed Time Difference of Arrival (OTDoA), Observed Angular Difference of Arrival (OADoA), and Observed Angular Difference of Departure (OADOD), with respect to LOS and reflection among multi-path components of the transmitted radio signal.

19. The non-transitory storage medium of claim 17, wherein the method comprises:
transmitting a CPP request for initiating a CPP measurement with a second network device of the group of network devices, the CPP request comprising information about a search area for cooperatively detecting and locating the at least one target object, when the operation mode is applied as initiating network device.

20. The non-transitory storage medium of claim 19, wherein the CPP request comprises information about an illumination by the transmitted radio signal, and wherein the illumination includes a general illumination or a partial illumination of neighborhood areas of a transmitting network device.

\* \* \* \* \*

UNITED STATES PATENT AND TRADEMARK OFFICE
CERTIFICATE OF CORRECTION

PATENT NO. : 12,146,936 B2
APPLICATION NO. : 17/206287
DATED : November 19, 2024
INVENTOR(S) : Jian Luo et al.

Page 1 of 1

It is certified that error appears in the above-identified patent and that said Letters Patent is hereby corrected as shown below:

In the Claims

In Column 18, In Line 56, In Claim 7, delete "OADOA," and insert -- OADoA, --.

In Column 20, In Line 53 (Approx.), In Claim 18, delete "(OADOD)," and insert -- (OADoD), --.

Signed and Sealed this
Fourth Day of March, 2025

Coke Morgan Stewart
*Acting Director of the United States Patent and Trademark Office*